(12) United States Patent
Suzuki

(10) Patent No.: US 6,266,772 B1
(45) Date of Patent: Jul. 24, 2001

(54) AUTHENTICATION SYSTEM FOR ELECTRONIC DATA OBJECTS TO BE OPENED TO PUBLIC, AND STORAGE MEDIUM

(75) Inventor: Yuji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/031,713

(22) Filed: Feb. 27, 1998

(30) Foreign Application Priority Data

Jul. 22, 1997 (JP) ..................................... 9-195618

(51) Int. Cl.[7] ..................................... H06F 01/26
(52) U.S. Cl. ..................... 713/182; 713/155; 713/156; 713/170
(58) Field of Search .................................. 713/155, 156, 713/168, 169, 170, 175, 182

(56) References Cited

U.S. PATENT DOCUMENTS

| Re. 34,954 | 5/1995 | Haber et al. . |
| 5,136,646 | 8/1992 | Haber et al. . |
| 5,136,647 | 8/1992 | Haber et al. . |

FOREIGN PATENT DOCUMENTS

| 0 541 727 B1 | 11/1999 | (EP) . |
| 6-501571 | 2/1994 | (JP) . |
| WO 92/03000 | 2/1992 | (WO) . |

OTHER PUBLICATIONS

"Applied Cryptography" by Schneier, 1995, pp.52.*
Nakagawa, et al., "A Self–Organizing Approach to Web Information Search", IPSJ SIG Notes, vol. 96, No. 103, (Oct. 24, 1996), pp. 39–46.
Tazawa, et al., "InfoNavigator: Search–Robot–Based Search–Service", Fujitsu, vol. 48, No. 2, (Mar. 10, 1997), pp. 187–193.
Takano, et al., "WINGNAVI: A navigation Support System for WWW", NEC Technical Journal, vol. 49, No. 7, (Jul. 30, 1996), pp. 45–50.
Koster, "The Web Robot FAQ . . . , http://info.webcrawler.com/mak/projects/robots/faq.html", (Feb. 9, 1996).

* cited by examiner

Primary Examiner—Thomas R. Peeso
(74) Attorney, Agent, or Firm—Staas & Halsey, LLP

(57) ABSTRACT

In case of giving an ID and a password to an applicant who has applied for authentication, an applicant management file constituting a WWW-contents-opening authentication system records information on the application, such as the name of the applicant and the ID as well as the password. Using the given ID as well as the password, the applicant who has accessed the WWW-contents-opening authentication system causes this system to display an application screen, on which he/she enters necessary items. After the necessary items have been entered, a contents collection robot constituting the WWW-contents-opening authentication system collects the WWW contents of the applicant at a predetermined time. Information on the collected WWW contents is stored in a contents-opening-authentication log file constituting the WWW-contents-opening authentication system, and the opening of the WWW contents to the public is authenticated on the basis of the stored information.

24 Claims, 11 Drawing Sheets

AUTHENTICATION SYSTEM FOR ELECTRONIC DATA OBJECTS TO BE OPENED TO PUBLIC, AND STORAGE MEDIUM

BACKGROUND OF THE INVENTION

1. Field of the Invention

The present invention relates to a system for authenticating the opening of electronic data which are to be generally opened to the public through a network.

2. Description of the Related Art

Recently, the Internet has been remarkably popularized, and enterprises, associations, individuals etc. in large numbers have set up home pages on the Internet. The users of the Internet can access such a large number of home pages and obtain multifarious information items with Web browsers.

Conversely speaking, the enterprises, associations, individuals etc. on the side of putting and offering the information on the home pages have opened the information to the large number of users who can access the home pages through the Internet. A marked trend to open issued objects as electronic data on the Internet is expected, unlike the conventional way of opening where information items are presented to the public by printing them on sheets of paper as in conventional magazines.

In the current circumstances, any information is freely written up on any home page by the information sending side, and no agency manages the contents of such information, the location of such a home page, and the time at which and the person by whom the information has been included on the home page. Accordingly, even when the issued object has been included on the home page as the electronic data, the whole responsibility is placed on the sender of the information.

As stated before, the information sender is free to write up the contents (WWW contents where "WWW" is short for "World Wide Web") of the object (electronic data object) to-be-opened being the electronic data which are to be included on the home page, and there has not been any system for authenticating the issuance and opening of the WWW contents. Accordingly, in case of altering the information opening method from the paper medium form (in which the information is printed on the sheets of paper) into the WWW publication form (in which the information is included as the electronic data on a home page or the like), the information sender has had the time of the opening and the contents of the information authenticated by preparing, not only the WWW contents, but also the same contents on a paper medium (e.g. in book or journal form), and then delivering the material to a public agency such as the National Diet Library in Japan.

In this manner, the authentication of the contents of the information as well as the time of the opening has necessitated the preparation of the printed publication of the same contents on a paper medium, separately from the opening of the WWW contents. Therefore, even when the opening of the contents has been performed electronically, the preparation of a printed publication is inevitable, so that the merits of the electronic opening are ruined by such drawbacks as an additional cost and the increased stock of unnecessary printed matter.

SUMMARY OF THE INVENTION

An object of the present invention is to provide an authentication system for data objects which are to be generally opened to the public in the form of electronic data on a network.

The first authentication system of the present invention for electronic data objects to-be-opened to the public is characterized by comprising applicant management means for entering and managing applicants for authentication of the electronic data objects to-be-opened; contents collection means for collecting contents of the electronic data object to-be-opened on a network, the contents being designated by the applicant entered in the applicant management means; and contents-opening-authentication log means for logging, at least, the contents of the electronic data object to-be-opened as collected by the contents collection means, and for offering in case of authenticating the opening of the electronic data object, data necessary for the authentication of the opening of the electronic data object on the basis of the logged contents.

The second authentication system of the present invention for electronic data objects to-be-opened to the public is characterized by comprising applicant management means for entering and managing applicants for authentication of the electronic data objects to-be-opened; opening means for opening onto a network, contents of the electronic data object forwarded from the applicant; and contents-opening-authentication log means for logging, at least, the contents of the electronic data object to-be-opened as forwarded from the applicant, and for offering in case of authenticating the opening of the electronic data object, data necessary for the authentication of the opening of the electronic data object on the basis of the logged contents.

According to the first authentication system for electronic data objects to be opened to the public, any person who requires the authentication of the opening of the electronic data object can have the contents of the electronic data object collected automatically by being registered in the authentication system, and the authentication of the opening to the public is issued on the basis of the result of the collection. Consequently, the operations of preparing the printed matter of the same contents in book or journal form and delivering the material to a public agency such as the National Diet Library in Japan need not be carried out for the purpose of obtaining the authentication of the opening of the electronic data object.

Further, according to the second authentication system for electronic data objects to be opened to the public, the preparation of printed matter is unnecessary. Moreover, any person who requires the authentication of the opening of the electronic data object can obtain this authentication by sending the electronic data object to the authentication system by himself/herself, so that the opening of the electronic data object can be authenticated by a simpler system construction.

DESCRIPTION OF THE PREFERRED EMBODIMENTS

Figure 1:
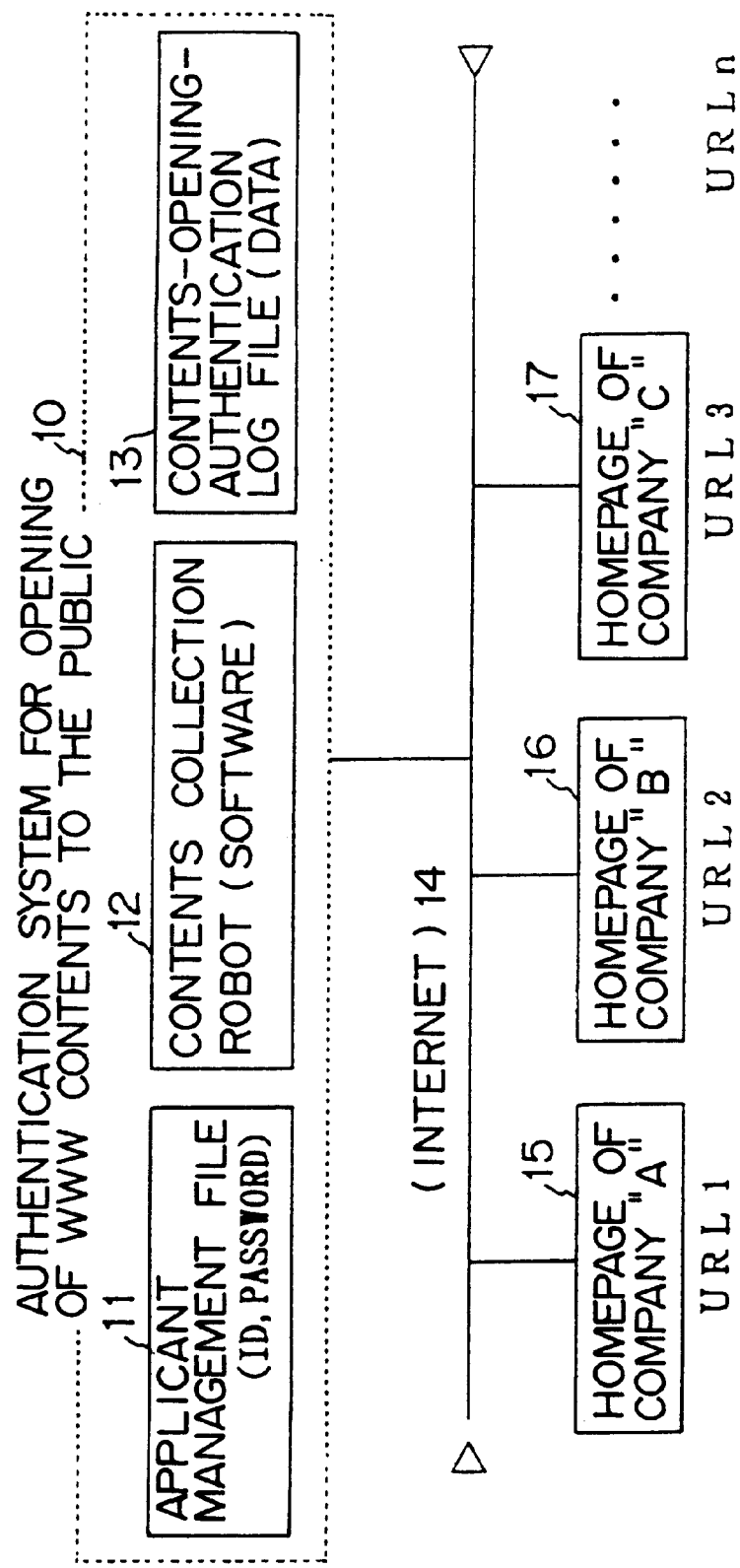
FIG. 1 is a block diagram of the configuration of the first aspect of the embodiments of a WWW-contents-opening authentication system according to the present invention.

FIG. 1 is a block diagram of the configuration of the first aspect of the embodiments of a WWW-contents-opening authentication system according to the present invention.

The authentication system 10 for the opening of WWW contents to the public is installed in an organization for certifying the opening (for example, any of public agencies such as various learned societies and associations). The WWW-contents-opening authentication system 10 can access the home pages 15 of Company "A", 16 of Company "B", 17 of Company "C", etc. through the Internet 14. URLs (uniform resource locators) are uniquely allocated to the respective home pages (or servers) in such a manner that the URL "1" is allocated to the Company-A's home page 15, the URL "2" is allocated to the Company-B's home page 16, and the URL "3" is allocated to the Company-C's home page 17. A desired one of the home pages can be accessed by specifying the URL.

It is known that the URLs of the servers are held in correspondence with IP addresses which are used in the communication protocol TCP/IP, and which are unique throughout the world, and that the server is specified by the IP address corresponding to the designated URL.

The WWW-contents-opening authentication system 10 is chiefly configured of two data files and one software item. An applicant management file 11 is the file for registering each applicant who has asked the organization possessing the WWW-contents-opening authentication system 10 to authenticate the opening of the WWW contents to the public. In the file 11, an ID, a password etc. for the applicant to be serviced by the WWW-contents-opening authentication system 10 through the Internet 14 are administered in correspondence with the information of the applicant himself/herself.

The applicant who desires the authentication of the opening of the WWW contents to the public (for example, the creator of the contents) is previously notified of the account data (ID, password etc.) of the WWW-contents-opening authentication system 10 by letter, electronic mail or the like by the organization for certifying the opening of the contents to the public (namely, the organization possessing the WWW-contents-opening authentication system 10).

A contents collection robot 12 is software called a "robot" by which the operation of acquiring the data of the WWW contents to have the opening authenticated is performed automatically without man power when a predetermined time has come. Such robots are actively utilized in the Internet technology at present, and information on the robots can also be obtained from on the Internet. More specifically, the robot is a program which automatically traces hypertext structures on the Web. It recursively iterates the steps of acquiring a certain document (page) and subsequently goes to see all pages referred to in the certain page. Here, the sequences in each of which the robot actually goes to see the pages are not always based on a fixed algorithm, but they differ depending upon the programs.

The details of the actual program of the contents collection robot 12 for use in this aspect of the embodiments are left to a design which is made by a person skilled in the art. In the ensuing description, the role of the contents collection robot 12 in this aspect of the embodiments shall be disclosed by specifying functions to be fulfilled by this robot 12.

A contents-opening-authentication log file 13 is the file which logs as data, the WWW contents acquired for the authentication of the opening from, for example, the Company-A's home page 15 by the contents collection robot 12, the date of the acquisition of the WWW contents, and so on. When the authentication system 10 has been requested by its user to authenticate the opening, the contents-opening-authentication log file 13 is referred to and is used for creating a necessary authenticating document.

Figure 2A:
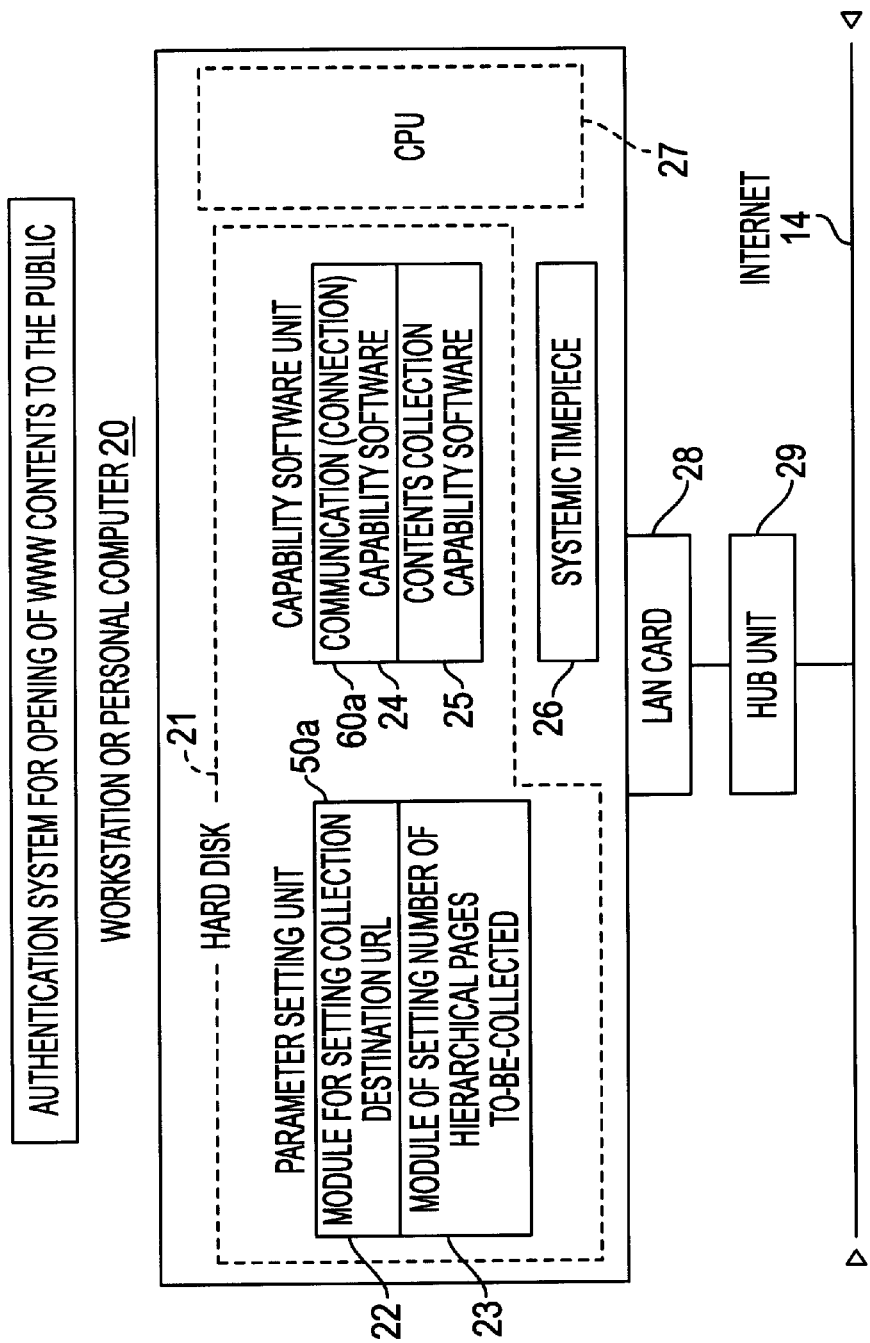
FIGS. 2A and 2B are diagrams showing the construction and processing flow of a contents collection robot in the first aspect of the embodiments of the present invention, respectively.
Figure 2B:
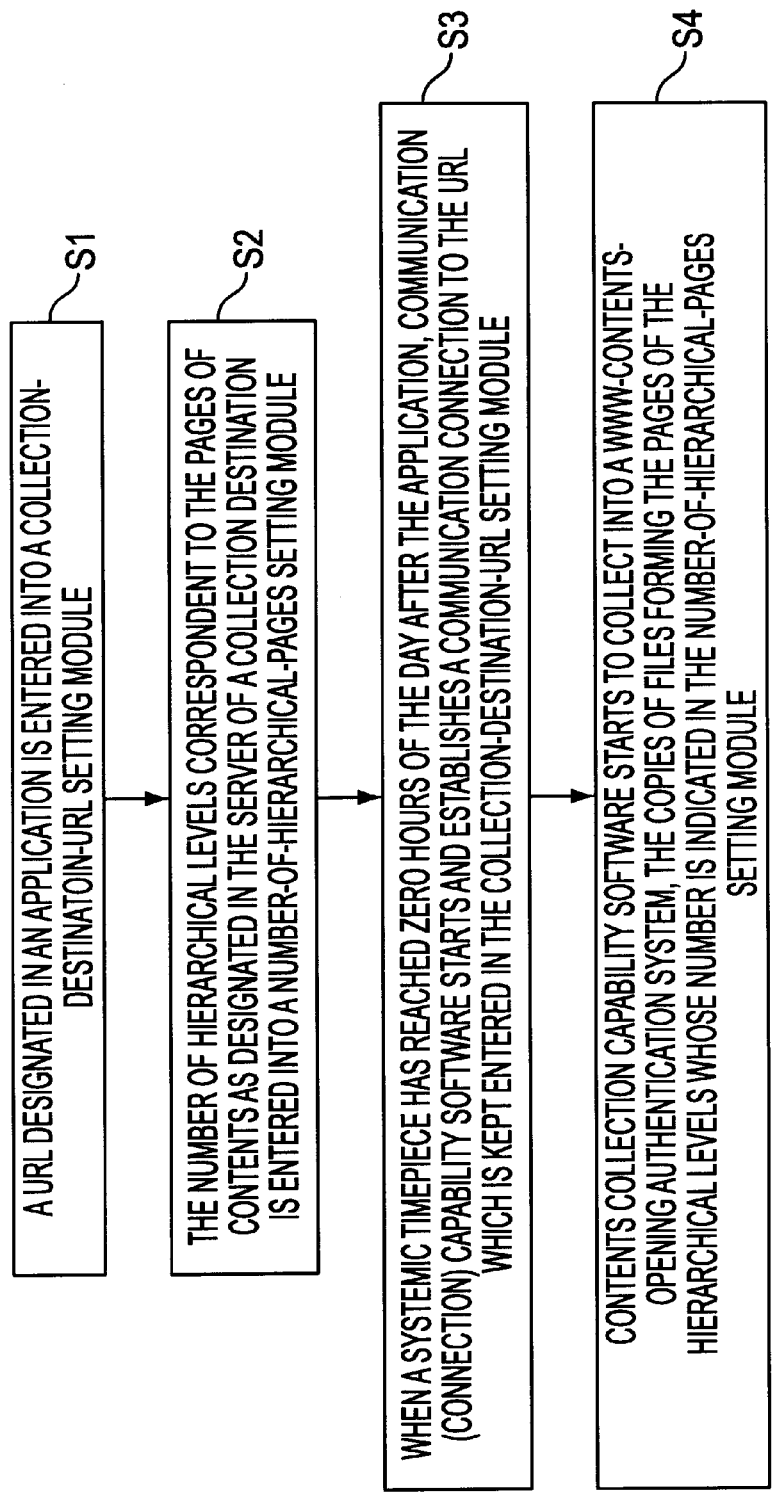

FIGS. 2A and 2B are diagrams showing the first construction and processing flow of the contents collection robot 12 which is included in the WWW-contents-opening authentication system 10 in the first aspect of the embodiments, respectively.

The contents collection robot 12 of the WWW-contents-opening authentication system 10 is installed in a workstation or personal computer 20 shown in FIG. 2A. Of course, the workstation or personal computer is not restrictive, but the contents collection robot 12 may well be installed in a main frame computer which is a large-sized computer. The applicant management file 11 and the contents-opening-authentication log file 13 are disposed besides the contents collection robot 12 in the WWW-contents-opening authentication system 10, and they may well be disposed together with the contents collection robot 12 in the hard disk 21 of the workstation or personal computer 20. Since, however, the quantity of data is considered to become large, a logging device should preferably be separately disposed so as to store the files 11 and 13 therein and to be used in such a way that the logging device is connected to the workstation or personal computer 20 through a network such as a LAN. Alternatively, a database server may well be disposed so as to administer the files 11 and 13 as a database. In this case, it is also allowed to adopt an architecture in which the database server and the workstation or personal computer 20 are connected to the same LAN.

The workstation or personal computer 20 is roughly constituted by the hard disk 21 and a CPU 27, and the contents collection robot 12 is stored in the hard disk 21. The contents collection robot 12 consists principally of a parameter setting unit 50a and a capability software unit 60a. The workstation or personal computer 20 may well be of a known construction wherein a CPU, a hard disk, a memory and various controllers are connected to a bus. It is so operated that a program is loaded from the hard disk or any other auxiliary storage device into the memory and is run by the CPU.

The parameter setting unit 50a includes a module 22 for setting a collection destination URL, and the number-of-hierarchical-pages setting module 23.

On the other hand, the capability software unit 60a includes communication (connection) capability software 24 and contents collection capability software 25. A systemic timepiece 26 is built in the system of the workstation or personal computer 20, and keeps the current time.

The collection-destination-URL setting module 22 is a memory area for entering that location (URL) of the home page which is designated by the applicant having requested to authenticate the opening to the public. The contents collection robot 12 accesses the home page of the collection destination on the basis of the location information of the home page set in the collection-destination-URL setting module 22, and then collects the contents.

The number-of-hierarchical-pages setting module 23 is a memory area for setting the information indicative of the last link goal up to which the contents collection robot 12 is to trace link goals entered in the home page of the collection destination. In general, the WWW contents form a hierarchical structure consisting of a plurality of pages, and the pages of lower hierarchical levels can be successively accessed by tracing link goals mentioned on the page of each hierarchical level. When the link goals on each page are traced in succession in this manner, it is possible that limitless contents might be acquired. As will be explained later, therefore, the applicant is asked to previously designate the number of those hierarchical pages the contents of which require the authentication of the opening, and the number of the hierarchical levels is set in the number-of-hierarchical-pages setting module 23.

The communication (connection) capability software 24 of the capability software unit 60a is a program which serves to establish a communication connection to the WWW contents to be collected through the Internet 14, and which effects an operation similar to the communication capability of a Web browser. The contents collection capability software 25 accesses the desired WWW contents to which the communication capability software 24 has established the communication connection by reference to the set value of the collection-destination-URL setting module 22. Herein, when the home page containing the desired WWW contents has been accessed on the basis of the URL set in the collection-destination-URL setting module 22, the contents collection capability software 25 acquires the accessed WWW contents (or stores the WWW contents in the hard disk 21 or any storage device separately installed).

In a case where the link goals are mentioned on the home page of the desired WWW contents, the contents collection capability software 25 accesses all the mentioned link goals and acquires the contents of an immediately lower hierarchical level. Further, in a case where link goals are contained in the contents of the immediately lower hierarchical level, the software 25 similarly accesses these link goals and acquires the contents of a still lower hierarchical level. In this manner, when link goals exist at the lower hierarchical level, the contents of the still lower hierarchical level are accessed. In due course, when the contents have been acquired in the number of hierarchical levels set in the number-of-hierarchical-pages setting module 23, the connection of the contents collection robot 12 to the contents is cut off.

The workstation or personal computer 20 in which the contents collection robot 12 is installed is furnished with the systemic timepiece 26, by which the current time is kept. The systemic timepiece 26 functions to inform the contents collection robot 12 of a time appointed for going to acquire the WWW contents of the applicant for the authentication of the opening.

The contents collection robot 12 including the above constituents is stored in the hard disk 21 as a program, which is run by the CPU 27. The program may well be loaded (installed) into the hard disk 21 from a portable storage medium such as floppy disk or CD-ROM. The workstation or personal computer 20 being the WWW-contents-opening authentication system is connected to a HUB unit 29 by a LAN card 28, and is connected to the Internet 14 through the HUB unit 29.

FIG. 2B illustrates the processing flow which is executed by the contents collection robot 12.

When any person applying for the authentication of the opening of WWW contents to the public has been entered, the URL of the WWW contents designated by the applicant is set in the module 22 for setting the URL of a collection destination, at step S1. At step S2, the number of hierarchical levels expressing how many hierarchical levels are formed in those pages of the WWW contents which the applicant desires to have the opening authenticated is set in the module 23 for setting the number-of-hierarchical-pages setting module 23.

At step S3, when the systemic timepiece 26 has reached zero hours of the day after the application, the communication (connection) capability software 24 starts to establish a communication connection to the URL which is held entered in the collection-destination-URL setting module 22. Here, the time of the communication connection to the URL of the collection destination has been exemplified as the zero hours of the day after the application. However, the date and hour of the communication connection are not always restricted to that example, but the designer or administrator of the system ought to set the optimum date and hour in the light of the congested situation of a communication line, etc. It is also allowed to establish the communication connection immediately after the information items have been set in the collection-destination-URL setting module 22 and the number-of-hierarchical-pages setting module 23 by the respective steps S1 and S2.

When the communication connection to the URL of the collection destination has been established, the contents collection capability software 25 starts at step S4. The contents collection capability software 25 copies files forming the pages of the hierarchical levels whose number is stored in the number-of-hierarchical-pages setting module 23, and it collects the files into the WWW-contents-opening authentication system 10.

Figure 3:
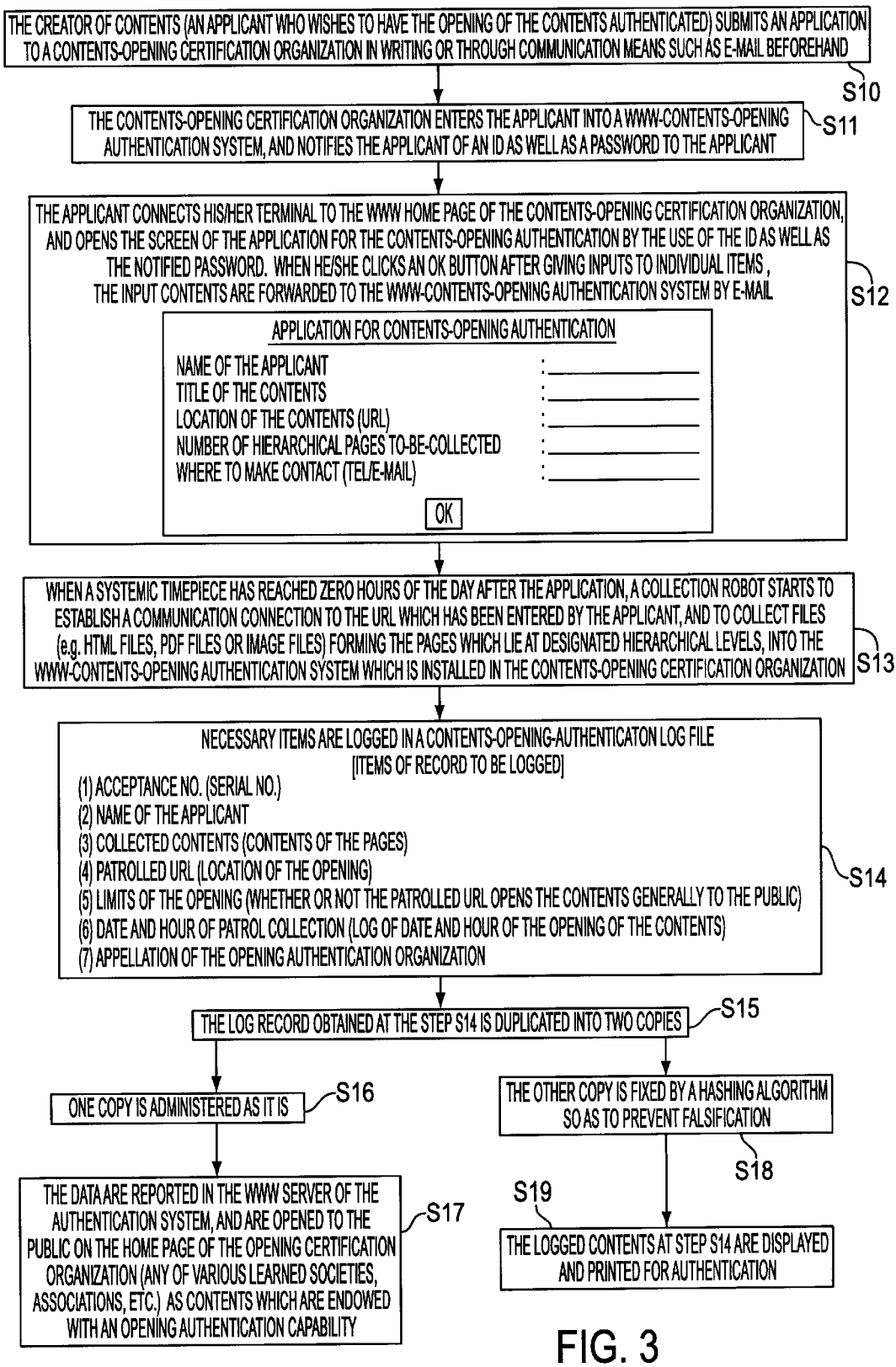
FIG. 3 is a diagram showing a flow from an application for the authentication of the opening of WWW contents, to the execution of the authentication of the opening in the first aspect of the embodiments.

FIG. 3 is a diagram showing a processing flow from an application for the authentication of the opening of WWW contents to the public, to the execution of the authentication of the opening, in the authentication system 10 in the first aspect of the embodiments as shown in FIG. 1.

At step S10, first of all, the creator of the contents (an applicant who wishes to have the opening of the contents authenticated) submits an application to a WWW-contents-opening certification organization in writing or through communication means such as electronic mail beforehand.

Upon receiving the application, the contents-opening certification organization enters the applicant into the applicant management file 11 of the WWW-contents-opening authentication system 10 and notifies the applicant of an ID as well as a password (step S11). An expedient for the notification may be electronic mail, or postal mail as well.

The applicant having received the ID as well as the password accesses the WWW home page of the contents-opening certification organization by the use of a Web browser or the like, and opens the screen of the application for the contents-opening authentication by the use of the ID as well as the password (step S12). Since items to be input are displayed on the screen of the application for the contents-opening authentication, the applicant enters necessary information into the input items.

In the case of FIG. 3, "Name of the Applicant", "Title of the Contents", "Location of the Contents (URL)", "Number of Hierarchical pages to-be-collected" and "Where to make contact (TEL/E-MAIL)" are mentioned as the input items by way of example. They are items which are considered necessary at the minimum. Therefore, if further items are considered necessary, they may well be displayed as input items on the screen of the application for the contents-opening authentication for prompting the applicant to enter necessary information.

When the applicant has filled out the screen of the application for the contents-opening authentication, he/she ends the input operation by pressing an "OK" button shown in FIG. 3, by way of example. Then, the input contents are forwarded to the WWW-contents-opening authentication system 10 by electronic mail. In this way, the location of the WWW contents (URL) is automatically set in the collection-destination-URL setting module 22 shown in FIG. 2A, and the number of hierarchical pages to-be-collected is automatically set in the number-of-hierarchical-pages setting module 23. Processing steps which are executed for the WWW-contents-opening authentication system 10 by the applicant end, are followed by processing steps which are executed by the WWW-contents-opening authentication system 10.

In the WWW-contents-opening authentication system 10 which has received the application at step S12, the contents collection robot 12 is started when the systemic timepiece 26 has reached the zero hours of the day after the application, by way of example. The communication (connection) capability software 24 establishes a communication connection to the URL entered by the applicant, through the Internet 14. Subsequently, files (e.g. HTML files, PDF files or image files) forming those pages of the WWW contents at the entered URL which lie at the designated hierarchical levels are collected by the contents collection capability software 25 into the WWW-contents-opening authentication system 10 which is installed in the contents-opening certification organization (step S13).

At step S14, necessary items are derived from the collected files and are logged in the contents-opening-authentication log file 13 as a single record. In the example of FIG. 3, "Acceptance No. (Serial No.)", "Name of the Applicant", "Collected contents (Contents of the Pages)", "URL patrolled by the Contents collection robot (Location of the Contents)", "Limits of the Opening (Whether or not the patrolled URL opens the contents generally to the public)", "Date and Hour of Patrol collection (Log of Date and Hour of the Opening of the Contents)" and "Appellation of the Opening authentication organization (Opening certification organization)" are mentioned as the examples of the necessary items (items to be logged in the record). Here, the expression "patrol" signifies that the contents collection robot 12 successively traces the link goals mentioned on the pages of the WWW contents. Besides, the "limits of the opening" are determined by, for example, judging on the basis of the collected result of the WWW contents as to if the URL of the contents exists within the fire wall of a private network which is possessed by a specified enterprise or association or the like. More specifically, in a case where an attempt at the connection to the URL designated as a link goal has failed, the page of the URL is judged whether it is opened to the public or not and to be in a closed state. The methods for closing the page of the URL are known such as a fire wall, encryption and restriction of the directory including the contents by which only a terminal which has specific IP address can access the directory. Considered as the aspects of the "limits of the opening" are, for example, "generally opened to the public" in the case where no page exists within the fire wall, and "partly closed" in the case where one or more of the pages exist within the fire wall. Further, the "opened" state or the "closed" state may well be logged every patrolled URL.

At step S15, the log record obtained at step S14 is duplicated into two copies. One of the copies is administered as it is (step S16). Further, at step S17, the record is put on the WWW server of the contents-opening authentication system 10, not shown in the figures, and it is opened to the public by the WWW server on the home page of the contents-opening certification organization (any of various learned societies, associations, etc.) as contents which are endowed with an opening authentication capability.

The other of the two copies of the log record prepared at the step S15 is encrypted and fixed by a hashing algorithm so as to prevent falsification (step S18). For the authentication of the opening of the contents, the contents of the log record obtained at the step S14 are displayed and printed to be issued as an authenticated document (step S19).

Figure 4A:
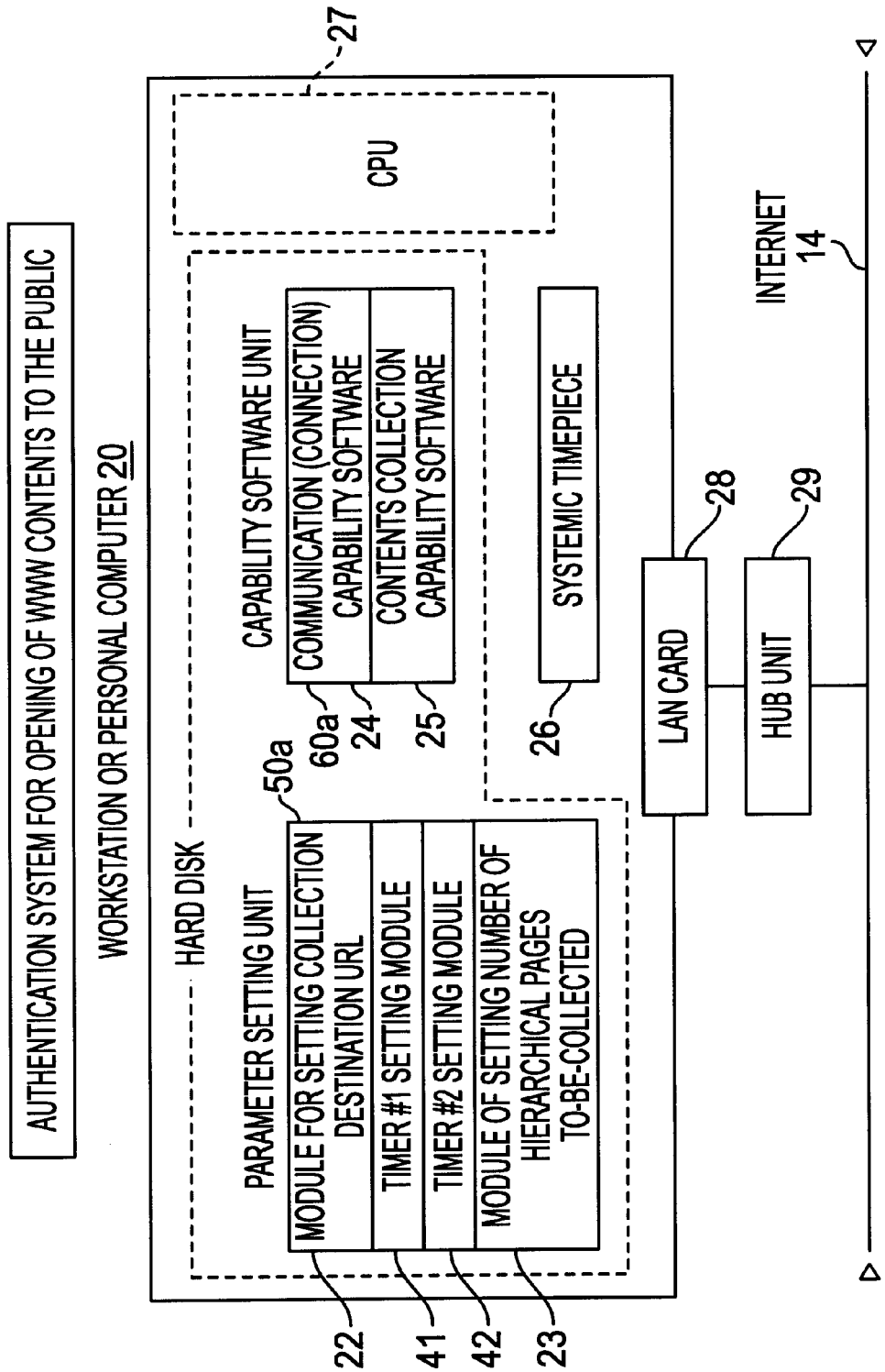
FIGS. 4A and 4B are diagrams showing the construction and processing flow of a contents collection robot in the second aspect of the embodiments of the WWW-contentsopening authentication system according to the present invention, respectively.
Figure 4B:
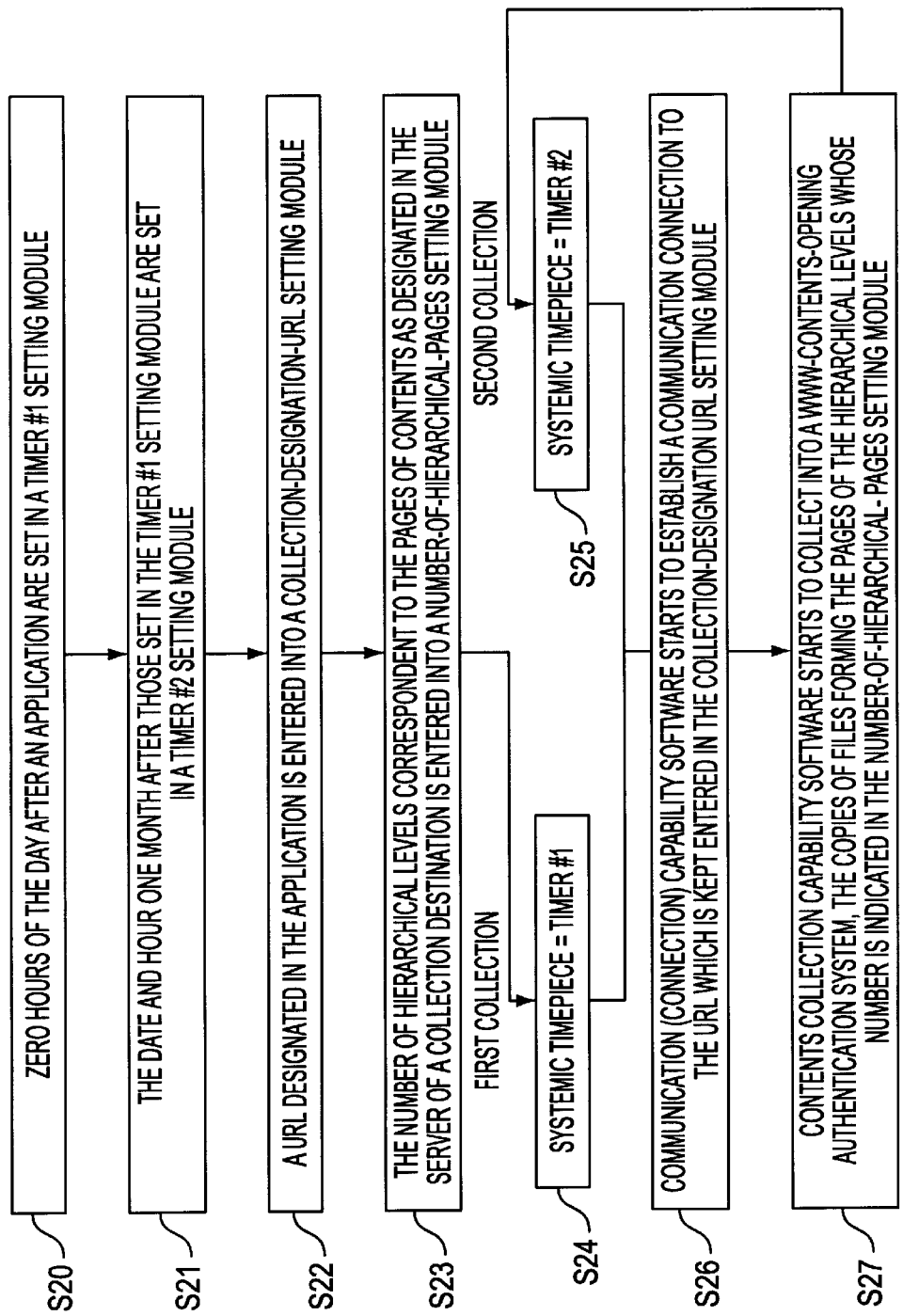

FIGS. 4A and 4B are diagrams showing the construction and processing flow of a contents collection robot 12 which is included in the second aspect of the embodiments of the WWW-contents-opening authentication system 10 of the present invention, respectively.

The point of difference of the second aspect of the embodiments from the first aspect consists in the operation of the contents collection robot 12. Concretely, the contents collection robot 12 goes to acquire the same WWW contents twice, at different times. Accordingly, the architecture of the second aspect of the embodiments corresponding to FIG. 1 is the same as that of the first aspect of the embodiments shown in FIG. 1 and shall be omitted from this description.

The contents collection robot 12 of the WWW-contents-opening authentication system 10 in the second aspect of the embodiments is installed in a workstation or personal computer 20 shown in FIG. 4A. In FIG. 4A, the same reference numerals are assigned to the same constituents as in the construction shown in FIG. 2A.

Likewise to the construction shown in FIG. 2A, the workstation or personal computer 20 is connected to the HUB unit 29 through the LAN card 28 and is connected to the Internet 14 through the HUB unit 29. The contents collection robot 12 in the second aspect of the embodiments is stored in the hard disk 21 as the program, which is run by the CPU 27. This program may well be loaded (installed) into the hard disk 21 from a portable storage medium in the same manner as in the first aspect of the embodiments.

The communication (connection) capability software 24 and contents collection capability software 25 of a capability software unit 60a, and the systemic timepiece 26 fulfill the same capabilities as in the construction shown in FIG. 2A, respectively. That is, the communication (connection) capability software 24 establishes a communication connection to desired WWW contents through the Internet 14, while the contents collection capability software 25 acquires the contents of the individual pages of the WWW contents to which the communication connection has been established by the communication (connection) capability software 24. Further, the systemic timepiece 26 informs the CPU 27 of each time at which the contents collection robot 12 is to start.

Also the collection-destination-URL setting module 22 and number-of-hierarchical-pages setting module 23 of a parameter setting unit 50a fulfill the same functions as those shown in FIG. 2A, so they shall be omitted from this description. In the second aspect of the embodiments, a timer #1 setting module 41 and a timer #2 setting module 42 are disposed in addition to the above constituents.

Both the timer #1 setting module 41 and the timer #2 setting module 42 are storage areas in which the starting times of the contents collection robot 12 are set. Especially in the second aspect of the embodiments, the contents collection robot 12 goes to collect the WWW contents of an identical URL twice, and hence, the two timer setting modules 41 and 42 are disposed for setting the dates and hours at which the robot 12 starts the collection.

The reason why the contents collection robot 12 goes to collect the WWW contents of the identical URL twice, is to confirm that the WWW contents acquired at the first collection have been opened to the public. A case will be considered, for example, where the applicant for the authentication of opening wrote up the WWW contents on his/her home page only when the contents collection robot 12 came to collect them, and where he/she erased the WWW contents from the home page immediately thereafter. Herein, the authentication of the opening of the WWW contents was obtained, but the corresponding information was, in fact, kept confidential because of the short term during which the information was actually opened to the public. In such a case, according to the first aspect of the embodiments, the opening certification organization unfavorably issues a formal opening certificate as to the WWW contents which are, in fact, closed to the public. Therefore, the second aspect of the embodiments is proposed in order to cope with such an unfavorable case.

As stated before, a large-sized computer such as main frame computer may well be employed instead of the workstation or personal computer 20. Besides, information such as the collected contents may well be stored in a storage device which is externally mounted.

FIG. 4B illustrates the processing flow of the contents collection robot 12 in the second aspect of the embodiments.

In a case where an applicant has submitted an application for the authentication of opening, the zero hours of the day after the application are set in the timer #1 setting module 41 at step S20. The time which is set in the timer #1 setting module 41 is the time at which the contents collection robot 12 first goes to collect the WWW contents designated in the application. As stated before, however, the time need not always be the zero hours of the day after the application, but it ought to be appropriately set.

At step S21, the date and hour one month after those set in the timer #1 setting module 41 are set in the timer #2 setting module 42. The time to be set in the timer #2 setting module 42 need not be one month after the time which has been set in the timer #1 setting module 41, either, but it ought to differ depending upon that term for the decision of the opening during which the same contents have been mentioned in the designated URL. The term is to be appropriately stipulated by the contents-opening certification organization which possesses the WWW-contents-opening authentication system 10, and it is not especially stipulated in this aspect of the embodiments.

At step S22, the designated URL is entered into a collection-destination-URL setting module 22. Subsequently, at step S23, the number of hierarchical levels expressing how many hierarchical levels are formed in the pages of the WWW contents in the server of the designated collection destination is entered into the number-of-hierarchical-pages setting module 23.

At step S24, the CPU 27 operates to judge whether or not the systemic timepiece 26 has reached the time stored in the timer #1 setting module 41. Subject to the time being reached, the communication (connection) capability software 24 starts at step S26, and it establishes a communication connection to the URL which is stored in the collection-destination-URL setting module 22. Further, the contents collection capability software 25 starts at step S27. The software 25 copies files forming the pages of the hierarchical levels whose number is indicated in the number-of-hierarchical-pages setting module 23, and it collects the files into the WWW-contents-opening authentication system 10.

Subsequently, whether or not the systemic timepiece 26 has reached the time held set in the timer #2 setting module 42 is again judged at step S25. In a case where the systemic timepiece 26 does not indicate the set time in the timer #2 setting module 42, the contents collection robot 12 remains in a standby state. In this regard, it is not efficient that one contents collection robot belongs exclusively to the opening authentication process of one applicant. Therefore, the robot 12 should preferably be caused to execute a process for another URL in the time period between the time of the first collection (the set time in the timer #1 setting module 41) and the time of the second collection (the set time in the timer #2 setting module 42) as appointed for one URL.

In a case where, at step S25, the systemic timepiece 26 indicates the set time in the timer #2 setting module 42, the communication (connection) capability software 24 of the contents collection robot 12 starts at the step S26, and it establishes a communication connection to the URL (the same URL as in the first collection) which is stored in the collection-destination-URL setting module 22. Further, in the same manner as in the first collection, the contents collection capability software 25 starts at the step S27. The software 25 copies the files of the pages forming the WWW contents, in accordance with the setting of the number-of-hierarchical-pages setting module 23, and it collects the files into the WWW-contents-opening authentication system 10.

As stated above, the contents collection robot 12 goes to acquire the WWW contents of the identical URL again after the predetermined time period. Thereafter, in the WWW-contents-opening authentication system 10, the two contents (e.g. of the HTML files, PDF files or image files) collected by the contents collection robot 12 are compared, and the opening is authenticated subject to the same contents.

The flow of such processing will be described below.

Figure 5:
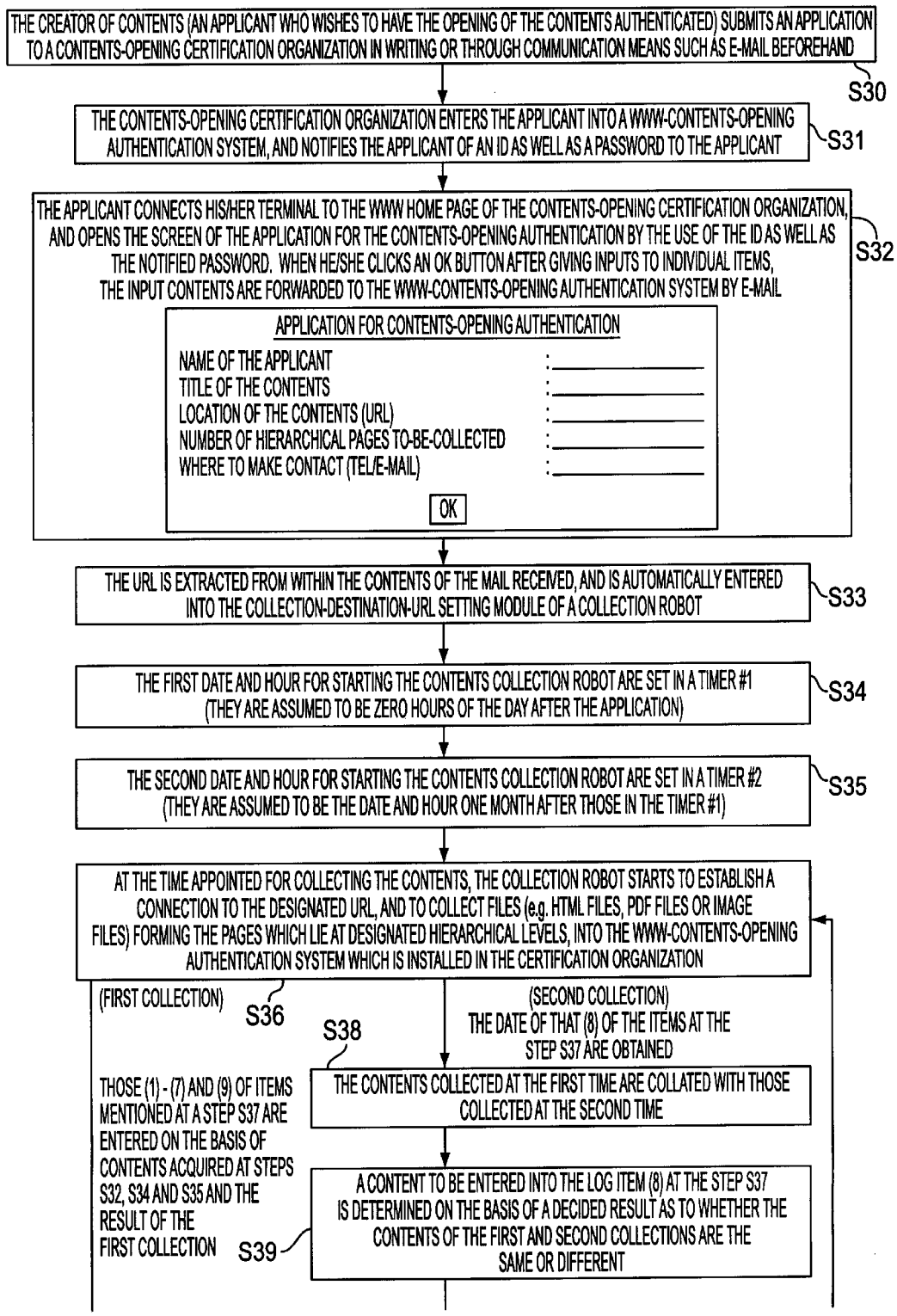
FIG. 5 is a diagram (#1) showing a flow from an application for the authentication of the opening of WWW contents, to the execution of the authentication of the opening in the second aspect of the embodiments.
Figure 6:
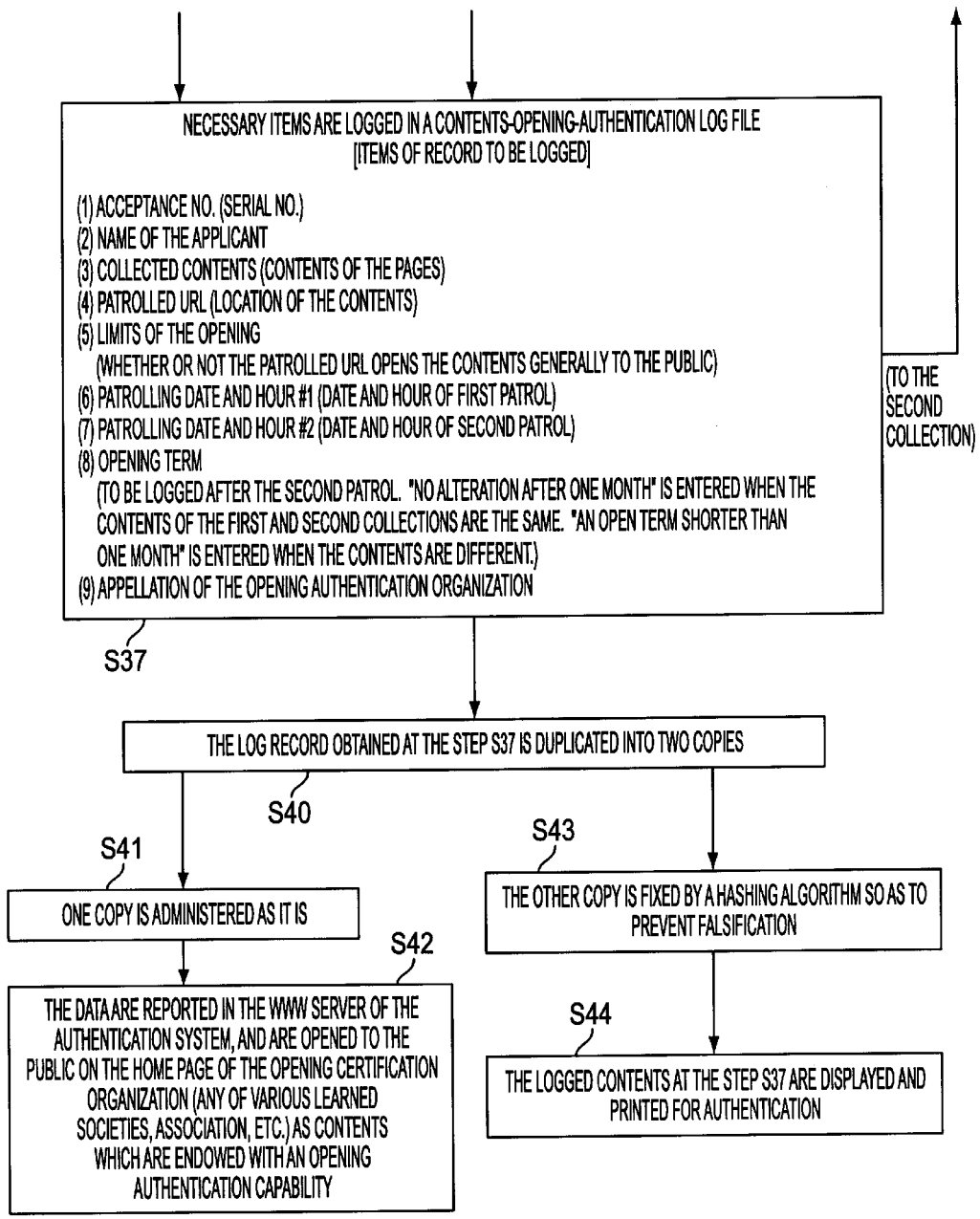
FIG. 6 is a diagram (#2) showing a flow from an application for the authentication of the opening of WWW contents, to the execution of the authentication of the opening in the second aspect of the embodiments.

FIG. 5 and FIG. 6 are diagrams showing the flow from an application for the authentication of the opening of WWW contents to the public, to the execution of the authentication of the opening, in the second aspect of the embodiments.

At step S30, the creator of contents (an applicant who wishes to have the opening of the contents authenticated) submits the application to a contents-opening certification organization in writing or through communication means such as electronic mail beforehand. At step S31, the contents-opening certification organization having received the application from the applicant enters the applicant into the applicant management file 11 of the WWW-contents-opening authentication system 10, and it notifies the applicant of an ID as well as a password.

The applicant connects his/her terminal to the WWW home page of the contents-opening certification organization, and opens the screen of the application for the contents-opening authentication by the use of the notified ID as well as the password. An example of the screen of the application for the contents-opening authentication is as shown in FIG. 5, and it is the same as in FIG. 3. The applicant forwards the input contents of the application to the WWW-contents-opening authentication system 10 through electronic mail by pressing an "OK" button (step S32).

At step S33, the WWW-contents-opening authentication system 10 extracts the URL of the applicant from within the mail received and automatically enters the URL into the collection-destination-URL setting module 22 of the contents collection robot 12. At step S34, the first date and hour for starting the contents collection robot 12 are set in the timer #1 setting module 41. Further, at step S35, the second date and hour for starting the contents collection robot 12 are set in the timer #2 setting module 42. Here, it is assumed by way of example that the set time in the timer #1 setting module 41 is the zero hours of the day after the application, while the set time in the timer #2 setting module 42 is one month after the set time in the timer #1 setting module 41.

When the systemic timepiece 26 indicates the set time in the timer #1 setting module 41, the contents collection robot 12 starts at step S36. The contents collection robot 12 establishes a connection to the designated URL, and it collects files forming the pages which lie at designated hierarchical levels, into the WWW-contents-opening authentication system 10 which is installed in the contents-opening certification organization.

At step S37, the data acquired at the above steps are logged in the contents-opening-authentication log file 13. In the first collection, all items indicated at step S37 in FIG. 6, except "Opening term", can be logged from the collected contents and the contents acquired at steps S32, S34 and S35. When the first collection has ended at step S37, the processing flow returns to step S36 so as to wait the time of the second collection.

When the systemic timepiece 26 indicates the set time in the timer #2 setting module 42, the contents collection robot 12 starts to collect the contents of the same URL as in the first collection. In the WWW-contents-opening authentication system 10, at step S38, the contents collected at the second time are collated with those collected at the first time. Then, at step S39, whether both are the same or different is judged. A content to be entered into the log item "Opening term" among the log items listed at step S37 in FIG. 6 is determined on the basis of the judgement at step S39.

At step S37, by way of example, "No alteration after one month" is entered as the log content of the "Opening term" on condition that the contents of the first and second collections are the same, and "An opening term shorter than one month" is entered on condition that the contents are different. Alternatively, the times of the first and second collections may well be logged on condition that the contents of the first and second collections are the same. In this way, the necessary items have been logged in the contents-opening-authentication log file 13. At step S40, therefore, the log record is duplicated into two copies.

One copy is administered as it is (step S41). The data of the log record are mentioned in the WWW server, which opens the data to the public on the home page of the contents-opening certification organization as contents which are endowed with an opening authentication capability (step S42). The other copy of the log record is encrypted and fixed by a hashing algorithm so as to prevent falsification (step S43). For the authentication, the logged contents obtained at step S37 are displayed and printed on the basis of the encrypted log record, and they are issued as an opening-authenticated document (step S44).

In a case where the WWW contents corresponding to the URL of the first collection are not found in the second collection, it may be decided that the WWW contents have been deleted. Thereupon, the steps S38 and S39 may be skipped to log "Shorter than one month" as the log item "Opening term" at step S37, together with the presentation of a display to the effect that the contents corresponding to the URL do not exist at present.

Figure 7:
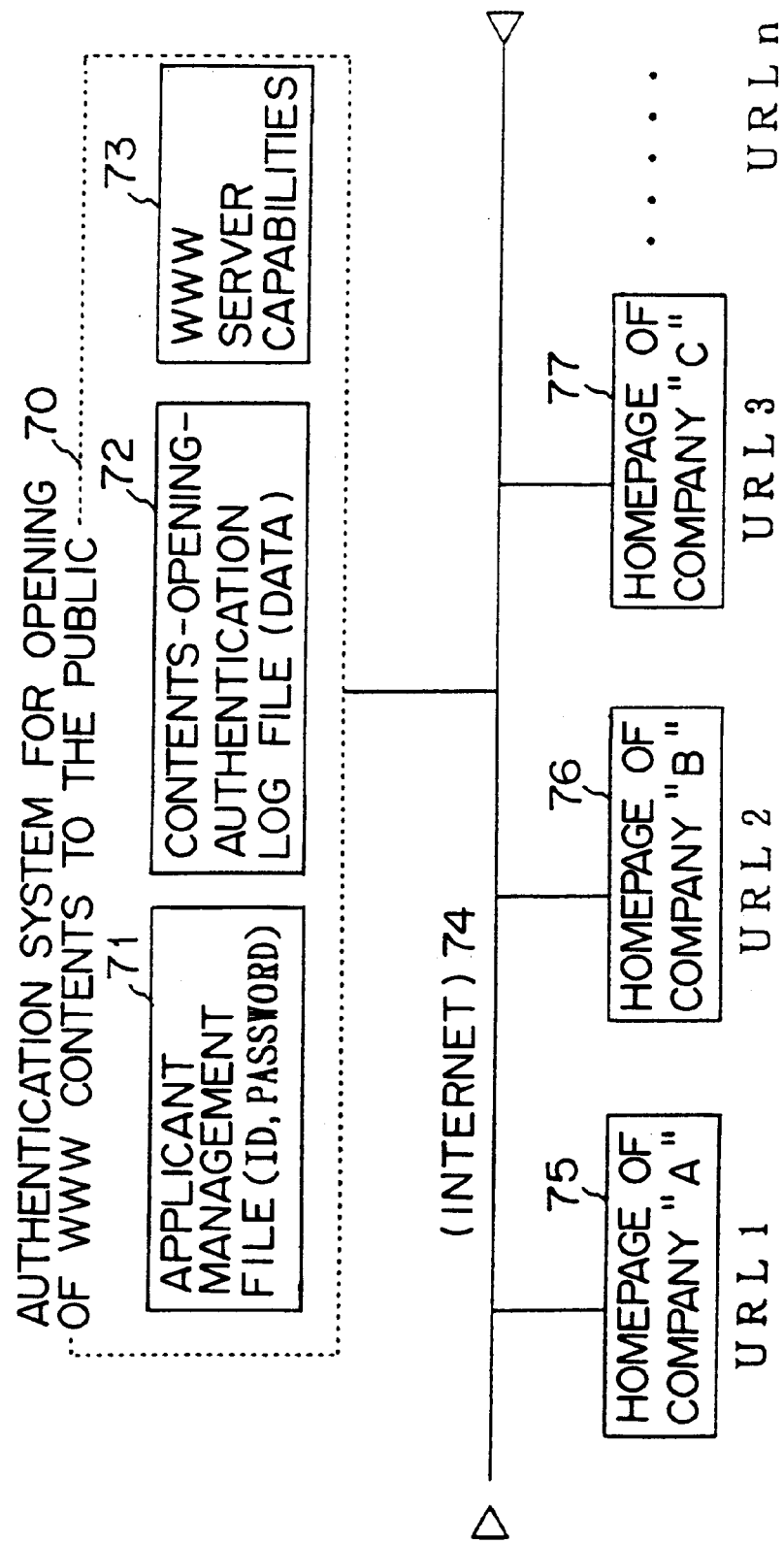
FIG. 7 is a block diagram of the configuration of the third aspect of the embodiments of the WWW-contents-opening authentication system according to the present invention.

FIG. 7 is a block diagram of the configuration of the third aspect of the embodiments of the WWW-contents-opening authentication system according to the present invention.

In the same manner as in the first or second aspect of the embodiments shown in FIG. 1, a WWW-contents-opening authentication system 70 is accessible to the respective home pages 75, 76 and 77 of companies "A", "B" and "C" through the Internet 74. In the third aspect of the embodiments, the WWW-contents-opening authentication system 70 is configured of an applicant management file 71, a contents-opening-authentication log file 72 and WWW server capabilities 73.

In the configuration shown in FIG. 7, the applicant management file 71 and the contents-opening-authentication log file 72 are disposed as in FIG. 1. The applicant management file 71 is such that, in a case where each person (applicant) who wishes to have the opening of WWW contents to the public authenticated has submitted an application to an opening certification organization in writing or through electronic mail or the like, an ID and a password afforded to the applicant are entered in this file together with the information of the applicant himself/herself. The contents-opening-authentication log file 72 is a file for logging acquired data necessary for the authentication of the opening of the WWW contents, such as the WWW contents and the open term thereof as designated by the creator of the contents.

In the third aspect of the embodiments, the WWW server capabilities 73 are substituted for the contents collection robot 12. More specifically, the first or second aspect of the embodiments consists in the configuration in which the contents collection robot 12 acquires the WWW contents designated by the applicant and logs the acquired contents in the contents-opening-authentication log file 13. In contrast, in the third aspect of the embodiments, the applicant has the opening authenticated in such a way that he/she transmits the WWW contents the opening of which is desired to be authenticated, so as to store them in the WWW-contents-opening authentication system 70. The WWW contents transmitted from the applicant are logged in the contents-opening-authentication log file 72, and are written up on the Internet 74 by the WWW server capabilities 73.

Owing to such a method, a procedure for authenticating the opening of the contents to the public is abridged, and the configuration of the WWW-contents-opening authentication system can be simplified.

Regarding the configuration of the WWW-contents-opening authentication system 70 shown in FIG. 7, the logging functions of the applicant management file 71 and the contents-opening-authentication log file 72 and the WWW server capabilities 73 may well be realized using a main frame computer. The authentication system 70, however, can also be realized by a computer system of comparatively small size in such a way that only the WWW server capabilities 73 are installed in a workstation, a personal computer or the like, and that the applicant management file 71 and the contents-opening-authentication log file 72 are stored in storage media which are separately mounted.

Figure 8:
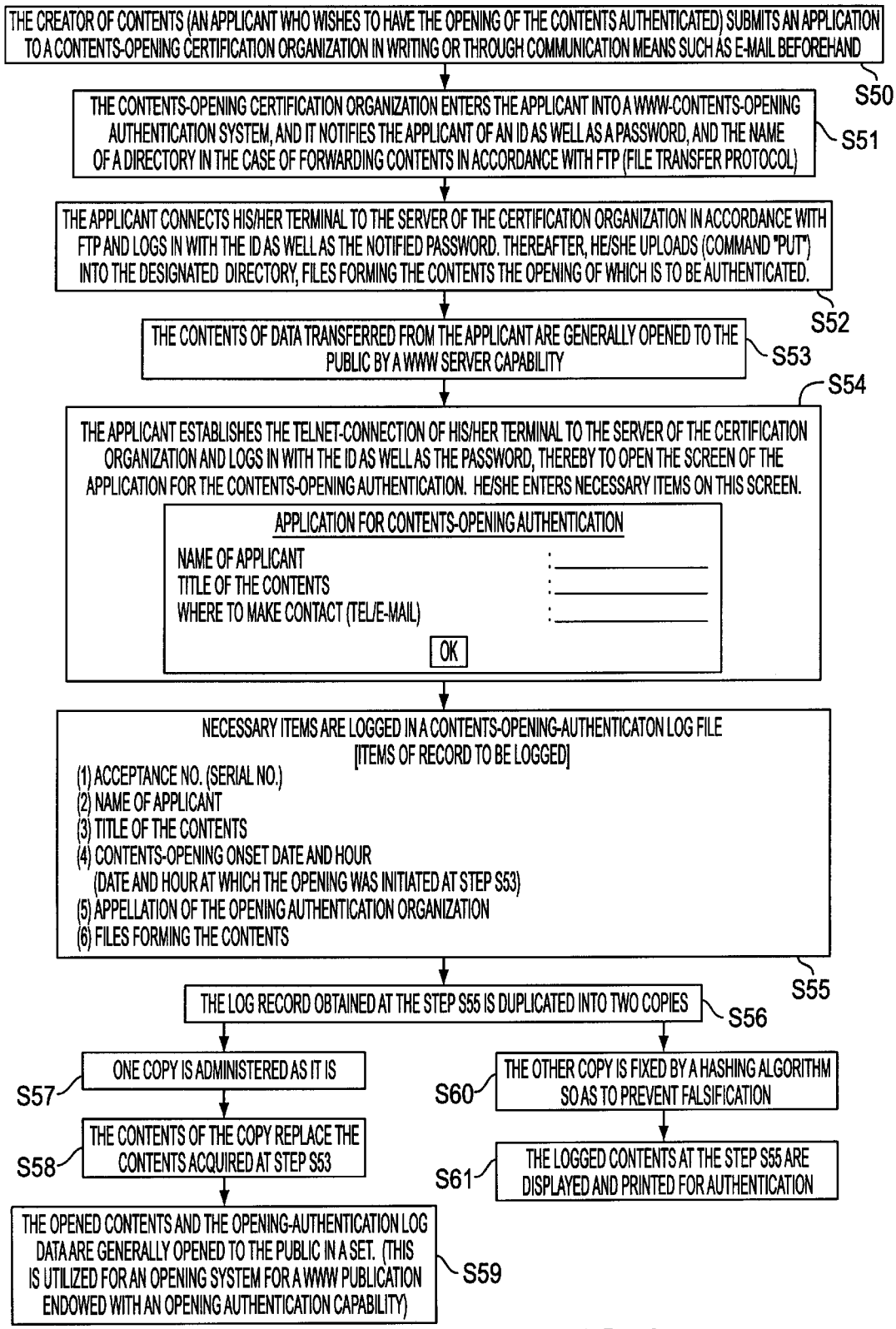
FIG. 8 is a diagram showing a flow from an application for the authentication of the opening of WWW contents, to the execution of the authentication of the opening in the third aspect of the embodiments.

FIG. 8 is a diagram showing the flow of processing from an application for the authentication of the opening of WWW contents, to the execution of the authentication of the opening in the third aspect of the embodiments.

At step S50, the creator of the contents (an applicant who wishes to have the opening of the contents authenticated) submits an application to a contents-opening certification organization in writing or through communication means such as electronic mail beforehand.

At step S51, the contents-opening certification organization (any of various learned societies, associations, etc. in possession of the contents-opening authentication system 70) enters the applicant into the applicant management file 71 of the WWW-contents-opening authentication system 70, and it notifies the applicant of an ID as well as a password, and the name of a directory within the contents-opening authentication system 70, the directory name being a destination in the case where the applicant forwards the contents by electronic communication. There are considered various protocols with which the applicant forwards the contents to the contents-opening authentication system 70, but the use of the "ftp (file transfer protocol)" is assumed here.

At step S52, the applicant connects his/her terminal to the server of the contents certification organization, not shown in the figures, with the "ftp" and logs in with the notified ID as well as the password. Thereafter, he/she unloads into the designated directory, files forming the contents the opening of which is to be authenticated. (In the case of the "ftp", there is a command "put" for uploading a file, and this command shall be used.)

On the side of the WWW-contents-opening authentication system 70, the contents of the data transferred from the applicant are generally opened to the public on the Internet 74 by the WWW server capabilities 73 (step S53). Subsequently, at step S54, the applicant establishes the telnet-connection of his/her terminal to the server of the contents-opening certification organization and logs in with the ID as well as the password, thereby to open the screen of the application for the contents-opening authentication. He/she enters necessary items on this screen. In the case of FIG. 8, "Name of the Applicant", "Title of the Contents" and "Where to make contact (TEL/E-MAIL)" are mentioned as the necessary items. The number of such items, however, may well be decreased or increased at need. When the applicant has input the necessary items and has pressed an "OK" button shown at step S54 in FIG. 8, the necessary items are forwarded to the contents-opening authentication system 70 by the use of the telnet. It has been described above that the server of the applicant is connected to the server of the contents-opening certification organization by the use of the telnet. It is also allowed, however, to adopt a scheme in which the applicant accesses an ordinary WWW home page and accesses there-from a screen for inputting the necessary items, and in which the data of the necessary items are forwarded to the contents-opening authentication system 70 when the applicant has ended the input operation.

In the contents-opening authentication system 70 having received the necessary items, these necessary items are logged in the contents-opening-authentication log file 72 (step S55). Here, an item corresponding to the "Opening term" in each of the foregoing aspects of the embodiments is "Contents-opening Onset Date and Hour" in the third aspect of the embodiments. The reason therefor is that, at step S53, the contents sent by the data transfer from the applicant have already been generally opened by the WWW server capabilities 73. Besides, since the opening of the contents is performed by the side of the contents-opening certification organization, the date and hour at which the opening of the contents was initiated are known to the side of the contents-opening certification organization. Accordingly, the certification organization need not inquire of the applicant side about the item "Contents-opening Onset Date and Hour". Another advantage is that the contents sent by the data transfer can be generally opened reliably.

Besides, an item "Files forming the Contents" is included at step S55. This item signifies the files of HTML sentences, PDF files or image data forming the contents opened at step S53.

When the necessary items have been written as a record into the contents-opening-authentication log file 72 at step S55, the log record (opening-authentication log record) is duplicated into two copies at step S56. One copy is administered as it is (step S57), and it replaces the contents which were opened at step S53 and which does not bear the opening authentication log yet (step S58). At step S59, the opened contents and the opening-authentication log data are generally opened to the public in a set on the Internet 74. This will be utilized for an opening system for a WWW publication endowed with an opening authentication.

The other of the two copies of the log record made at step S56 is encrypted and fixed by a hashing algorithm so as to prevent falsification (step S60). For authentication, the logged contents obtained at the step S55 are displayed and printed as an opening-authenticated document (step S61).

Figure 9:
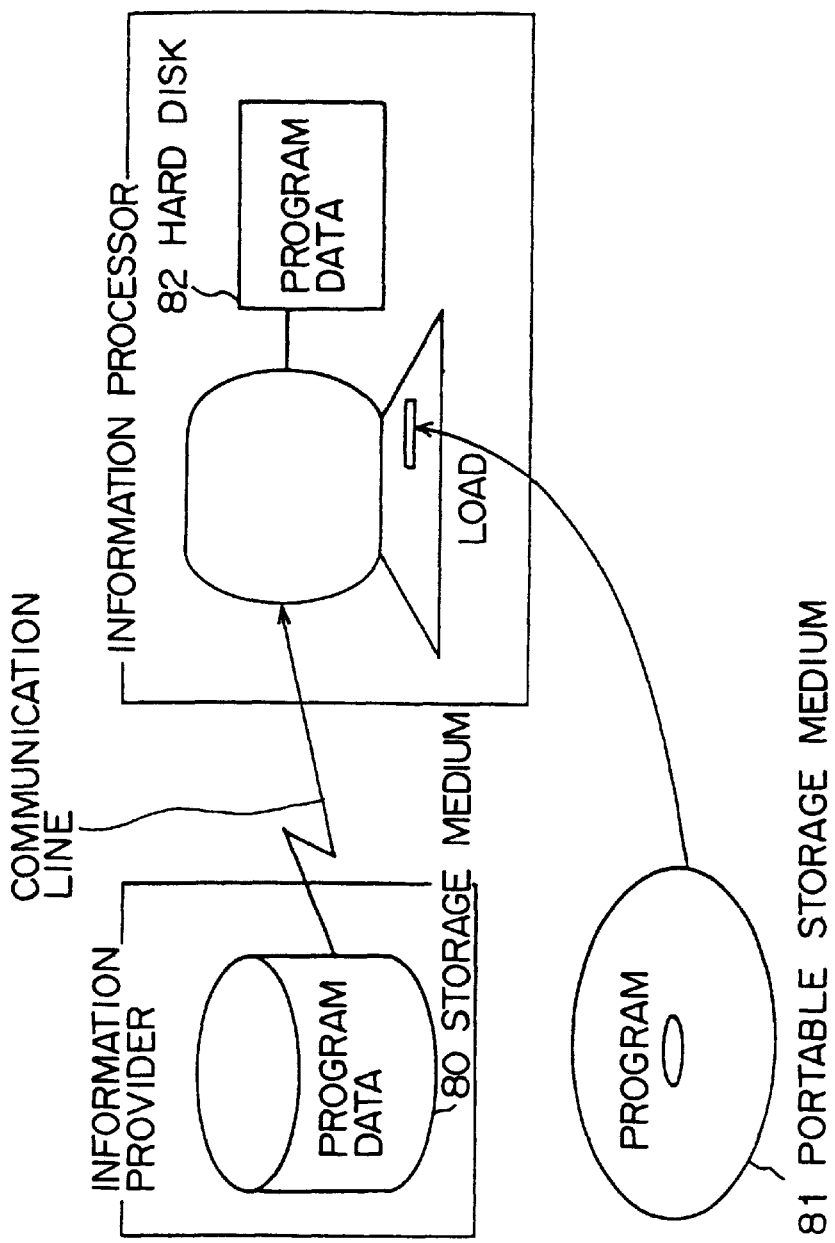
FIG. 9 is a diagram showing a storage media.

FIG. 9 is a diagram showing storage media.

The WWW-contents-opening authentication system stated in each of the aspects of the embodiments of the present invention can be realized as a program which is executed on a workstation or personal computer. In the foregoing, the program has been explained as being stored in the hard disk 82 of the workstation or personal computer (information processor) and being executed at need.

However, the program of the WWW-contents-opening authentication system need not always be stored in the hard disk 82 of the information processor. By way of example, it may well be loaded into the information processor from a portable storage medium 81, such as a floppy disk or CD-ROM, so as to be run by the information processor.

Alternatively, the information processor may well communicate with an information provider through a communication line and download the program of the WWW-contents-opening authentication system from a storage medium 80 possessed by the information provider, so as to execute the program in the information processor.

According to the present invention, in a case where a creator has created a document or the like of electronic data form, such as WWW contents, he/she can have the contents and the time of the opening thereof authenticated without separately preparing a printed publication on a paper medium, by registering the contents etc. in the system of the present invention for authenticating the opening of the contents of an electronic data object to the public.

What is claimed is:

1. An authentication system for electronic data objects to be opened to the public, comprising:

an applicant management unit entering and managing applicants for authentication of the electronic data objects to-be-opened;

a contents collection unit collecting contents of the electronic data object to-be-opened on a network, the contents being designated by the applicant entered in said applicant management unit and also collecting a publication date of the contents used for authenticating the electronic data object to be opened; and a contents-opening-authentication log unit logging, at least, said contents of said electronic data object to-be-opened as collected by said contents collection unit, and offering in case of authenticating the opening of said electronic data object, data necessary for the authentication of said opening of said electronic data object on the basis of the logged contents.

2. An authentication system for electronic data objects to be opened to the public as defined in claim 1, wherein said applicant management unit enters at least one of an ID and a password of which said applicant is notified.

3. An authentication system for electronic data objects to be opened to the public as defined in claim 2, wherein said applicant is authorized to use said authentication system, on the basis of an input of at least one of the ID and the password.

4. An authentication system for electronic data objects to be opened to the public as defined in claim 1, wherein when a predetermined time has come, said contents collection unit automatically collects through the network said contents of said electronic data object to-be-opened as designated by said applicant.

5. An authentication system for electronic data objects to be opened to the public as defined in claim 4, wherein said contents collection unit includes:

a first storage unit storing therein a location of said electronic data object to-be-opened on said network;

a second storage unit storing therein the number of hierarchical levels of a hierarchical structure formed by each page of said electronic data object to-be-opened;

a communication unit establishing a communication connection of said authentication system through said network to the location of said electronic data object to-be-opened as stored in said first storage unit; and a collection capability unit collecting said contents of said electronic data object to-be-opened to the amount of pages thereof in said number of the hierarchical levels as stored in said second storage unit.

6. An authentication system for electronic data objects to be opened to the public as defined in claim 4, wherein said contents collection unit collects said contents of said electronic data object to-be opened as designated by said applicant, through the network, at least two different times.

7. An authentication system for electronic data objects to be opened to the public as defined in claim 6, wherein said contents collection unit includes:

a first storage unit storing therein a location of said electronic data object to-be-opened on said network;

a second storage unit storing therein the number of hierarchical levels of a hierarchical structure formed by each page of said electronic data object to-be-opened;

a third storage unit storing therein the first time for the collection;

a fourth storage unit storing therein the second time for the collection;

a communication unit establishing a communication connection of said authentication system through said network to the location of said electronic data object to-be-opened as stored in said first storage unit; and a collection capability unit collecting said contents of said electronic data object to-be-opened to the amount of pages thereof in said number of the hierarchical levels as stored in said second storage unit.

8. An authentication system for electronic data objects to be opened to the public as defined in claim 1, wherein said contents-opening-authentication log unit logs, at least a name of each of the applicants, said contents of said electronic data object to-be opened, a location of said electronic data object to-be-opened, accessible limits of said electronic data object to-be-opened, and a time for the collection of said electronic data object to-be-opened.

9. An authentication system for electronic data objects to be opened to the public as defined in claim 1, wherein said contents-opening-authentication log unit contains at least two sets of data which are necessary for said authentication of said opening of the same contents, and one of which is logged in an encrypted form.

10. An authentication system for electronic data objects to be opened to the public, comprising:

an applicant management unit entering and managing applicants for authentication of the electronic data objects to-be-opened;

an opening unit opening onto a network, contents of the electronic data object forwarded from the applicant; and a contents-opening-authentication log unit logging, at least the contents of said electronic data object to-be-opened and a publication date of the contents used for authenticating the electronic data object to be opened as forwarded from said applicant, and for offering in case of authenticating the opening of said electronic data object, data necessary for the authentication of said opening of said electronic data object on the basis of the logged contents.

11. An authentication system for electronic data objects to be opened to the public as defined in claim 10, wherein said applicant management unit enters at least one of an ID and a password of which said applicant is notified.

12. An authentication system for electronic data objects to be opened to the public as defined in claim 11, wherein said applicant is authorized to use said authentication system, on the basis of an input of at least one of the ID and the password.

13. An authentication system for electronic data objects to be opened to the public as defined in claim 10, wherein said contents-opening-authentication log unit logs, at least, a name of each of the applicants, said contents of said electronic data object to-be-opened, and an opening onset time of said electronic data object to-be-opened.

14. An authentication system for electronic dataobjects to be opened to the public as defined in claim 10, wherein said contents-opening-authentication log unit contains at least two sets of data which are necessary for said authentication of said opening of the same contents, and one of which is logged in an encrypted form.

15. A computer-readable storage medium in which a program is stored, the program causing a computer to execute:

a procedure for collecting contents of an electronic data object to-be-opened on a network as designated by an application for authentication;

a procedure for logging collection time information together with the collected contents of the electronic data object to-be-opened; and a procedure for outputting the logged contents of said electronic data object to-be-opened and the logged collection time information.

16. A computer-readable storage medium in which a program is stored, the program causing a computer to execute:

a procedure for collecting contents of an electronic data object to-be-opened on a network as designated by an application for authentication, on the basis of first temporal information;

a procedure for collecting the designated contents of the electronic data object to-be-opened on the network on the basis of second temporal information;

a procedure for logging open term information relevant to the first temporal information and the second temporal information, together with the collected contents of said electronic data object to-be-opened; and a procedure for outputting the logged contents of said electronic data object to-be-opened and the logged opening term information.

17. A computer-readable storage medium in which a program is stored, the program causing a computer to execute:

a procedure for receiving contents of an electronic data object to-be-opened from an applicant with a publication date of the contents used for authenticating the electronic data object to be opened;

a procedure for opening the received contents of the electronic data object on a network; and a procedure for outputting the opened contents of said electronic data object and information in an open term of said electronic data object.

18. An authentication system for electronic data objects to be opened to the public, comprising:

an applicant management unit entering and managing applicants for authentication of the electronic data objects to-be-opened;

a contents collection unit collecting contents of the electronic data object to-be-opened on a network, the contents being designated by the applicant entered in said applicant management; and a contents-opening-authentication log unit logging, at least, said contents of said electronic data object to-be-opened as collected by said contents collection unit, and offering in case of authenticating the opening of said electronic data object, data necessary for the authentication of said opening of said electronic data object on the basis of the logged contents, wherein when a predetermined time has come, said contents collection unit automatically collects through the network said contents of said electronic data object to-be-opened as designated by said applicant.

19. An authentication system for electronic data objects to be opened to the public as defined in claim 18, wherein said contents collection unit includes:

a first storage unit storing therein a location of said electronic data object to-be-opened on said network;

a second storage unit storing therein the number of hierarchical levels of a hierarchical structure formed by each page of said electronic data object to-be-opened;

a communication unit establishing a communication connection of said authentication system through said network to the location of said electronic data object to-be-opened as stored in said first storage unit; and a collection capability unit collecting said contents of said electronic data object to-be-opened to the amount of pages thereof in said number of the hierarchical levels as stored in said second storage unit.

20. An authentication system for electronic data objects to be opened to the public as defined in claim 18, wherein said contents collection unit collects said contents of said electronic data object to-be opened as designated by said applicant, through the network, at least two different times.

21. An authentication system for electronic data objects to be opened to the public as defined in claim 20, wherein said contents collection unit includes:

a first storage unit storing therein a location of said electronic data object to-be-opened on said network;

a second storage unit storing therein the number of hierarchical levels of a hierarchical structure formed by each page of said electronic data object to-be-opened;

a third storage unit storing therein the first time for the collection;

a fourth storage unit storing therein the second time for the collection;

a communication unit establishing a communication connection of said authentication system through said network to the location of said electronic data object to-be-opened as stored in said first storage unit; and a collection capability unit collecting said contents of said electronic data object to-be-opened to the amount of pages thereof in said number of the hierarchical levels as stored in said second storage unit.

22. A method comprising:

storing a document received via a computer communications network from an authorized user;

comparing the stored document with a second document publicly available on a computer communications network; and logging a result of the comparing on a computer communications network.

23. A computer readable storage medium storing a program instructing a computer to perform:

storing a document received via a computer communications network from an authorized user;

comparing the stored document with a second document publicly available on a computer communications network; and logging the results of the comparing on a computer communications network.

24. An apparatus comprising:

a management unit storing a document received via a computer communications network from an authorized user;

a comparing unit comparing the received document with a second document publicly available on a computer communications network; and a logging unit logging a result from the comparing unit on a computer communications network.

* * * * *